(12) United States Patent
Disam

(10) Patent No.: US 11,987,199 B2
(45) Date of Patent: May 21, 2024

(54) ASSEMBLY FORMED FROM A COVER CAP OF A DIFFUSER OF A PIPED GAS GENERATOR AND A DEFLECTOR ELEMENT, PIPED GAS GENERATOR, AND METHOD FOR PRODUCING A PIPED GAS GENERATOR

(71) Applicant: ZF AUTOMOTIVE GERMANY GMBH, Alfdorf (DE)

(72) Inventor: Robert Disam, Mutlangen (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 17/637,483

(22) PCT Filed: Aug. 18, 2020

(86) PCT No.: PCT/EP2020/073043
§ 371 (c)(1),
(2) Date: Feb. 23, 2022

(87) PCT Pub. No.: WO2021/037602
PCT Pub. Date: Mar. 4, 2021

(65) Prior Publication Data
US 2022/0274557 A1 Sep. 1, 2022

(30) Foreign Application Priority Data

Aug. 27, 2019 (DE) ...................... 10 2019 122 990.1

(51) Int. Cl.
*B60R 21/261* (2011.01)
(52) U.S. Cl.
CPC .... *B60R 21/261* (2013.01); *B60R 2021/2617* (2013.01)
(58) Field of Classification Search
CPC ................ B60R 21/261; B60R 2021/2617
See application file for complete search history.

(56) References Cited

U.S. PATENT DOCUMENTS 3,966,228 A * 6/1976 Neuman ............... B60R 21/268
137/71
4,021,058 A * 5/1977 Suzuki .................. B60R 21/261
137/71
(Continued)

FOREIGN PATENT DOCUMENTS

DE 29702011 U1 6/1997
DE 19850448 A1 5/2000
(Continued)

OTHER PUBLICATIONS

PCT International Search Report for corresponding Application Serial No. PCT/EP2020/073043, dated Oct. 26, 2020, pp. 1-4.

*Primary Examiner* — Barry Gooden, Jr.
(74) *Attorney, Agent, or Firm* — TAROLLI, SUNDHEIM, COVELL & TUMMINO L.L.P.

(57) ABSTRACT

In an assembly group (12) consisting of a cap (14) of a diffusor of a tubular gas generator (10) and a deflector element (16), the cap (14) comprises an outflow opening for gas generated by the tubular gas generator (10) and the deflector element (16) comprises a discharge portion (34) having at least one discharge opening (42b) through which gas exits the cap (14). The deflector element (16) is inserted into the outflow opening so that the discharge portion (34) protrudes laterally outwardly through the outflow opening, projects there from the cap (14), and an edge portion of the deflector element (16) abuts on an edge of the outflow opening at an inner face of a wall of the cap (14). The discharge portion (34) of the deflector element (16) is pushed from an interior of the cap (14) through the outflow opening until the edge portion abuts on the inner face of the edge of the outflow opening, and subsequently the cap (14) is firmly fixed to the tubular gas generator (10).

11 Claims, 3 Drawing Sheets

(56) References Cited

U.S. PATENT DOCUMENTS

| | | | | |
|---|---|---|---|---|
| 4,084,839 A * | 4/1978 | Takagi | B60R 21/26 | 280/736 |
| 4,114,924 A | 9/1978 | Kasagi et al. | | |
| 6,070,903 A * | 6/2000 | Beisswenger | B60R 21/213 | 280/736 |
| 6,152,484 A * | 11/2000 | Fischer | B60R 21/26 | 280/730.2 |
| 6,179,323 B1 * | 1/2001 | Shellabarger | B60R 21/26 | 280/736 |
| 6,412,810 B1 * | 7/2002 | Wipasuramonton | B60R 21/232 | 280/730.2 |
| 11,548,466 B2 * | 1/2023 | Disam | B60R 21/2171 | |
| 2003/0029349 A1 * | 2/2003 | Katsuda | B60R 21/268 | 102/530 |
| 2003/0090093 A1 | 5/2003 | Keda et al. | | |
| 2003/0168841 A1 * | 9/2003 | Goto | B60R 21/272 | 280/740 |
| 2004/0036263 A1 * | 2/2004 | Henderson | B60R 21/26 | 280/741 |
| 2005/0121883 A1 * | 6/2005 | Joos | B60R 21/201 | 280/728.2 |
| 2006/0225280 A1 * | 10/2006 | Bibo | B60R 21/261 | 29/890.02 |
| 2006/0261582 A1 * | 11/2006 | Fischer | B60R 21/261 | 280/736 |
| 2007/0216145 A1 * | 9/2007 | Schang | B60R 21/26 | 280/736 |
| 2013/0112102 A1 * | 5/2013 | Arnold | B60R 21/261 | 102/530 |
| 2021/0009075 A1 * | 1/2021 | Schoenborn | B60R 21/262 | |
| 2022/0001826 A1 * | 1/2022 | Disam | B60R 21/262 | |
| 2022/0266788 A1 * | 8/2022 | Weber | B60R 21/261 | |
| 2022/0324410 A1 * | 10/2022 | Jung | B60R 21/2171 | |
| 2022/0332273 A1 * | 10/2022 | Fischer | B60R 21/2171 | |
| 2022/0340100 A1 * | 10/2022 | Jung | B60R 21/264 | |

FOREIGN PATENT DOCUMENTS

| | | | | |
|---|---|---|---|---|
| DE | 19957578 A1 | 5/2001 | | |
| DE | 20300500 U1 * | 6/2003 | | B60R 21/26 |
| DE | 20215541 U1 | 2/2004 | | |
| DE | 102004005555 A1 * | 9/2005 | | B60R 21/26 |
| DE | 102008063789 A1 | 7/2010 | | |
| DE | 102020115988 A1 * | 1/2021 | | B01D 46/0047 |
| JP | S53109342 A | 9/1978 | | |

* cited by examiner

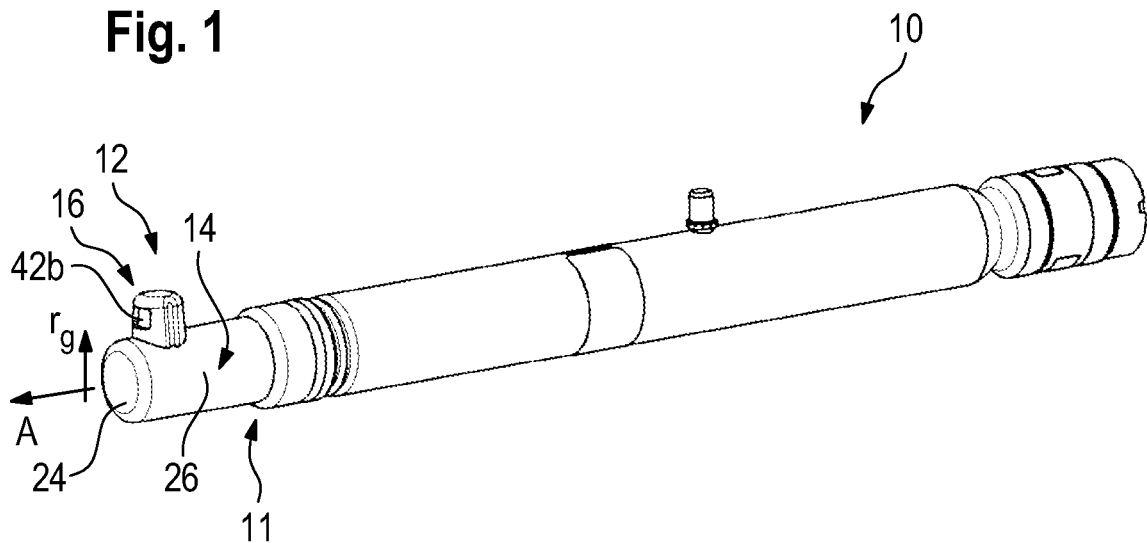
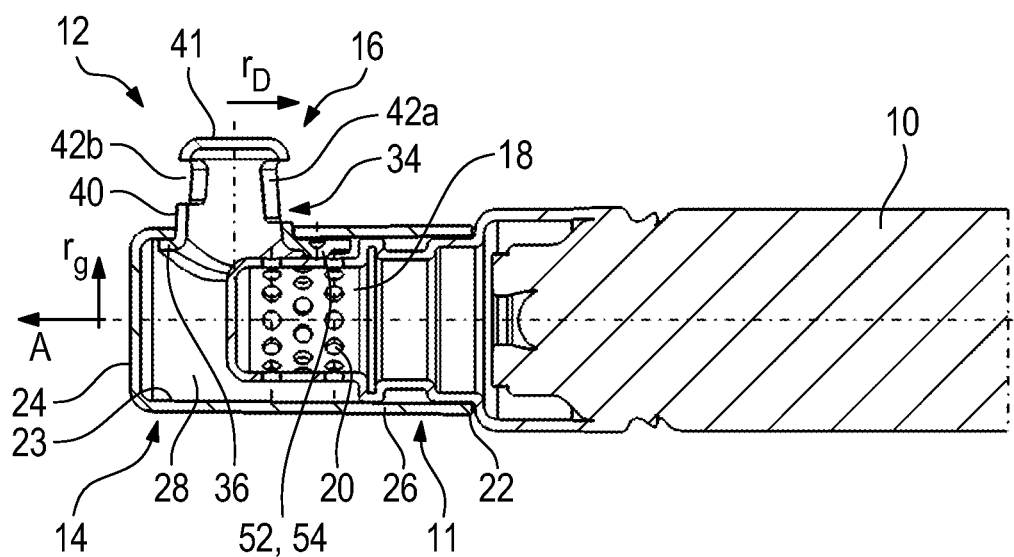

ASSEMBLY FORMED FROM A COVER CAP OF A DIFFUSER OF A PIPED GAS GENERATOR AND A DEFLECTOR ELEMENT, PIPED GAS GENERATOR, AND METHOD FOR PRODUCING A PIPED GAS GENERATOR

RELATED APPLICATIONS

This application is a U.S. National Stage Application filed under 35 USC 371, claiming priority to Serial No. PCT/EP2020/073043, filed on 18 Aug. 2020; which claims priority from German Patent Application DE 10 2019 122 990.1, filed 27 Aug. 2019, the entireties of which are hereby incorporated herein by reference.

TECHNICAL FIELD

The invention relates to an assembly group consisting of a cap of a diffusor of a tubular gas generator and a deflector element, to a tubular gas generator comprising such assembly group and to a method for manufacturing a tubular gas generator.

BACKGROUND

In elongate gas generators, also referred to as tubular gas generators, usually the outflow region is formed by a plurality of gas outlet openings spread over the circumference of the gas generator. Said outflow region is frequently realized by a diffusor disposed at an axial end of the tubular gas generator. The gas flows off in the radial direction, and the gas outlet openings are usually evenly spread over the circumference to maintain the generator thrust-neutral when it is activated.

In a lot of airbag modules, the tubular gas generator is arranged so that its outflow region is located inside of the inflatable volume of an airbag. This design is found, for example, in curtain-like side airbags or else in side airbags which are installed in a backrest of a vehicle seat.

However, frequently a radial gas discharge is a drawback, as specific filling of individual airbags or individual chambers of an airbag is impeded hereby. It is also difficult to divide the gas exiting the tubular gas generator into plural gas flows.

In this context, it is known, for example, to provide a specific fabric layer which surrounds the outflow region of the tubular gas generator in the circumferential direction and which both protects the airbag fabric from the exiting gas and deflects the gas flow in the axial direction. A specific division of the gas flow is not possible, however, by virtue of the flexibility of the fabric layer.

It is also known to provide a so-called gas lance which has a tube length open at both ends and which is axially attached to a tubular gas generator to transfer the outflowing gas over a distance of several decimeters to an airbag arranged at a distance from the tubular gas generator. Although in this way a directed gas flow into the airbag can be generated, it is not possible, however, to dispose the outflow region of the tubular gas generator directly on or in the airbag, which inevitably causes an increase in the dimension of the airbag module.

Moreover, for the use with different airbag modules, the entire gas routing must always be adapted in a complicated manner.

SUMMARY

It is the object of the invention to provide a flexible option to direct the gas flowing out of the tubular gas generator to its point of use, while providing a small size, proper possibilities of adaptation to different geometries and low manufacturing costs, as well as with the option to divide the gas flow into several gas flows.

This object is achieved by an assembly group comprising the features of claim 1. The assembly group consists of a cap of a diffusor of a tubular gas generator and a deflector element, the cap having an outflow opening for gas generated by the tubular gas generator and the deflector element having a discharge portion with at least one discharge opening through which the gas leaves the cap. The deflector element is inserted in the outflow opening so that the discharge portion protrudes laterally outwardly through the outflow opening, projects there from the cap, and an edge portion of the deflector element is adjacent to an edge of the outflow opening on an inner face of a wall of the cap.

Since the deflector element and the cap are two separate components, a uniform cap adapted to the respectively used tubular gas generator can be used together with differently shaped deflector elements so that, depending on the application, an appropriate deflector element can be selected. Thus, the assembly group can be employed in a very flexible manner and, at the same time, is inexpensive, because only different deflector elements must be provided in each case.

It is possible, by means of the deflector element, to deflect the gas radially flowing out of the tubular gas generator to a different direction, in particular along the axial direction of the tubular gas generator, which is more favorable for a lot of applications. For example, the assembly group can be used for a tubular gas generator of a side airbag module including a curtain-like side airbag in which gentler introduction of gas is possible as the gas is deflected by the deflector element.

When the deflector element includes several discharge openings, also a division of the gas exiting the tubular gas generator into several gas flows possibly comprising different amounts of gas can be easily achieved.

The cap may be a simply formed component that consists substantially of a tube having one open end and one closed end as well as one or more outflow openings. At least one outflow opening is preferably disposed in a circumferential wall of the cap. Preferably, only one single outflow opening is provided in the cap.

The open end of the cap is slipped onto the diffusor and is connected to the tubular gas generator in a firm and preferably gas-tight manner.

The inner face of the circumferential wall of the cap is spaced apart from the diffusor of the tubular gas generator so that usually an annular collection chamber is formed between the diffusor and the circumferential wall of the cap. Preferably, also the closed end of the cap projects somewhat from the axial end of the diffusor so that the collection chamber extends beyond the axial end of the diffusor.

The gas exiting the diffusor of the tubular gas generator in the radial direction accumulates between the outer wall of the diffusor and the inner face of the circumferential wall of the cap and, after accumulating, exits the outflow opening, wherein initially it flows into the deflector element and then through the discharge opening(s) thereof into the environment of the tubular gas generator and into an airbag, for example.

The discharge opening of the deflector element is preferably axially directed so that the deflector element deflects the gas flow exiting the outflow opening in the axial direction.

In this application, the axial direction is always defined by the longitudinal direction of the tubular gas generator which also corresponds to the longitudinal direction of the cap, when the assembly group is fixed to the tubular gas generator.

The discharge portion of the deflector element projects particularly radially from a circumferential wall of the cap.

The edge portion of the deflector element can also be utilized to seal the transition between the cap and the deflector element, more precisely the edge of the outflow opening.

As a rule, the deflector element is rigid and has such an inherent stiffness that it is not significantly deformed either when it is inserted into the outflow opening or when the gas exits through the discharge opening, even if it is possible to jam the deflector element in the outflow opening.

The discharge portion is preferably pot-shaped, and the edge portion is disposed at a cap-side edge of the discharge portion and projects from the discharge portion particularly at about right angles, while the at least one discharge opening is provided in a sidewall of the discharge portion. In this way, the edge portion provides the position of the discharge portion in a simple manner and, at the same time, secures the deflector element on the cap.

The edge portion should be peripheral around the cap-side edge of the discharge portion and can thus follow the curvature of the wall of the cap to achieve a better sealing effect.

The end of the deflector element facing away from the edge portion is usually sealed in a gastight manner by a lid so that the only gas discharge from the tubular gas generator is carried out via the at least one discharge opening of the deflector element.

Preferably, both the cap and the deflector element consist of an appropriate metal.

Then the deflector element can be manufactured, for example, as a deep-drawn part or as a stamped part, wherein during forming the cap-side edge is bent to form the edge portion.

In any case, the deflector element is preferably a one-piece component part separate from the cap to minimize the manufacturing costs.

The deflector element is advantageously provided to be pushed from the inside of the cap through the outflow opening, as in this way the edge portion can be easily placed on the inside of the circumferential wall of the cap. In particular, the deflector element can be mounted exclusively from inside.

In order to predetermine a clear positioning of the deflector element, preferably the shape of the surface of the outflow opening is adapted to the cross-sectional shape of the discharge portion of the deflector element. Thus, a non-circular shape can be selected.

However, it is also possible to design the cross-section of the outflow opening and of the deflector element to be substantially circular, but to provide a positioning structure at the cap and at the deflector element which permits to mount the deflector element to the cap in a predetermined orientation only. Such positioning structure may be, for example, a projection at the edge of the outflow opening and a groove along the discharge portion (or vice versa).

In order to allow the edge portion to abut on the edge of the outflow opening, the surface area enclosed by the edge portion over the entire circumference is advantageously larger than the outflow openings.

Preferably, the deflector element includes two oppositely directed discharge openings through each of which a gas flow exits the assembly group. Thus, two different chambers of one airbag or else two separate airbags can be simultaneously filled, where appropriate, while an at least partial thrust neutrality of the tubular gas generator can be maintained. It is equally possible, of course, to place the deflector element inside a chamber of an airbag so that all the gas flows, deflected by the deflector element, into the same chamber.

Of preference, exactly two discharge openings are provided so that the discharge openings may be selected to be so large that they offer only relatively small flow resistance to the outflowing gas.

All discharge openings are preferably arranged in the sidewall of the discharge portion.

The discharge openings may have differently large cross-sectional areas so that the gas exiting the tubular gas generator can be divided into several gas flows with different amounts of flow. For example, a division of gas at a ratio of 60/40 or 70/30 is possible. This may be advantageous to fill chambers or airbags of different sizes with an identical internal pressure.

If, however, the thrust neutrality of the tubular gas generator is in the foreground, the cross-sectional areas of the discharge openings should be selected to be equally sized.

The surface area of the discharge opening(s) preferably points along the axial direction, which is of advantage as regards the geometry of known side airbags. For other applications, the orientation of the discharge opening(s) can be easily adapted by appropriate positioning on the deflector element, as a matter of course.

In order to prevent undesirable noise development, at the deflector element preferably rattle protection is provided which, in the mounted state, prevents the deflector element from moving relative to the cap and the tubular gas generator.

The rattle protection may be formed particularly by a radial projection at the edge portion that is provided for contacting an outer circumference of the tubular gas generator, such as the diffusor of the tubular gas generator (in this case, the radial direction refers to a longitudinal direction of the deflector element). Said projection may be biased to press against the tubular gas generator.

Optionally, the rattle protection can be simultaneously used to secure the position of the deflector element.

The afore-mentioned object is also achieved by a tubular gas generator at one axial end of which a particularly thrust-neutral diffusor is provided, the diffusor comprising numerous gas outlet openings on a circumferential wall, as well as an assembly group as described above. The cap is slipped over the diffusor, and between the diffusor and the cap a collection chamber is formed through which gas flows to the deflector element when the tubular gas generator is activated.

The cap is a component part initially separate from the tubular gas generator and is fabricated separately therefrom.

Preferably, the at least one discharge opening at the deflector element is the only opening through which a gas flow flows from the tubular gas generator into the environment thereof and to an intended use.

Also, a method for manufacturing a tubular gas generator as afore-described achieves the object mentioned at the beginning. For this purpose, the following steps are carried out. The discharge portion of the deflector element is pushed from an interior of the cap through the outflow opening, until the edge portion abuts on the inside of the edge of the outflow opening. Subsequently, the cap is tightly fixed to the tubular gas generator.

Hence, initially the deflector element is mounted to the cap, before said assembly group is slipped over the diffusor of the tubular gas generator and is fixed typically to a circumferential wall of the tubular gas generator.

Fixation on the tubular gas generator can be carried out, for example, by crimping, flaring or, where appropriate, roller-burnishing the open end of the cap.

The deflector element is preferably rigid in itself and is not significantly deformed when it is inserted into the outflow openings. However, the deflector element may be intended to be jammed in the outflow opening by an applied pressing force.

The invention provides in particular the option to simply select for each application, from a choice of different deflector elements having suitable discharge openings, a deflector element which is then mounted to the cap, while only one single variant of the cap has to be provided which is adapted to the tubular gas generator.

BRIEF DESCRIPTION OF THE DRAWINGS

In the following, the invention shall be described in detail by means of plural embodiments with reference to the attached figures, where in the drawings:

FIG. 1 shows a schematic perspective view of a tubular gas generator according to the invention comprising an assembly group according to the invention in the completely mounted state;

FIG. 2 shows a schematic sectional view of the assembly group and of an axial end of the tubular gas generator from FIG. 1;

DESCRIPTION

Figure 3:
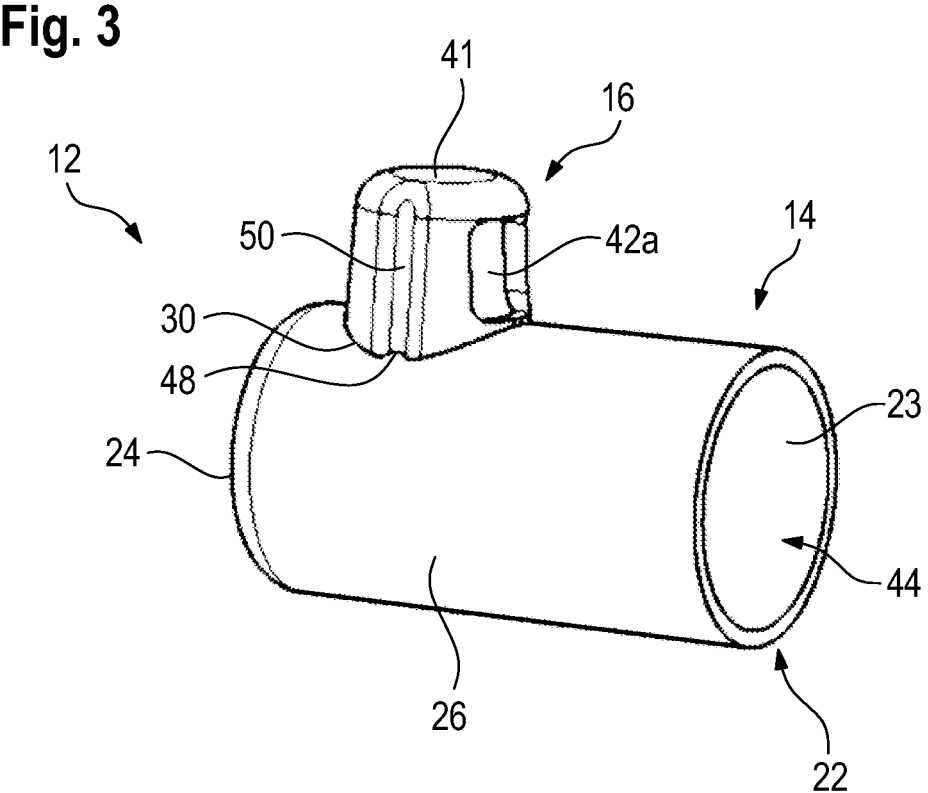
FIG. 3 shows a schematic perspective view of a completely mounted assembly group according to the invention consisting of a cap and a deflector element.
Figure 4:
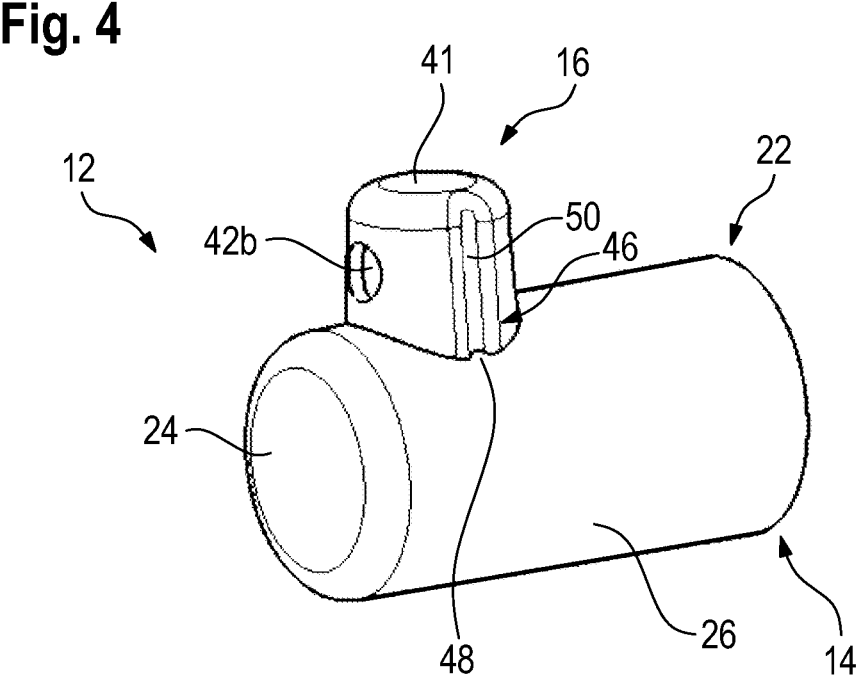
FIG. 4 shows the assembly group from FIG. 3 in a different view.

FIGS. 1 and 2 illustrate a tubular gas generator 10 comprising an assembly group 12 attached to an axial end 11 and consisting of a cap 14 and a deflector element 16.

As is shown in FIG. 2, the tubular gas generator 10 comprises at the axial end 11 a diffusor 18 that includes an outflow region having a plurality of circumferentially spread gas outlet openings 20.

All of the gas outlet openings 20 are radially directed (relating to an axial direction A that coincides with the longitudinal direction of the tubular gas generator 10) so that the tubular gas generator 10 per se is preferably thrust-neutral.

Figure 5:
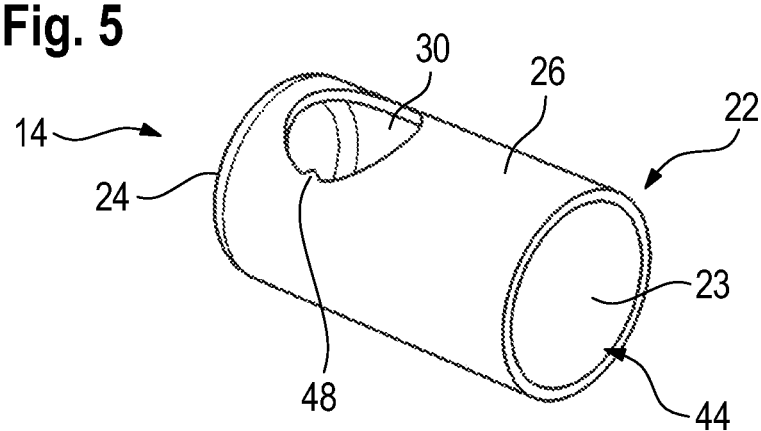
FIG. 5 shows a schematic perspective view of a cap of an assembly group according to the invention.

The cap 14 in the example shown here is a tube length having a somewhat larger diameter than the diffusor 18 of the tubular gas generator 10 with an open end 22 and a closed end 24 (see also FIG. 5). The open end 22 is attached onto the diffusor 18 of the tubular gas generator 10 and is adjacent to a circumferential wall of the tubular gas generator 10 to which it is also fastened in a firm and gastight manner.

There is a free space between the diffusor 18 and an inner face 23 of a circumferential wall 26 of the cap 14, the free space forming a collection chamber 28 for gas exiting the tubular gas generator 10 when the latter is activated. The closed end 24 of the cap 14 in the shown embodiment is spaced a little from the axial end of the diffusor 18 in the axial direction A. The collection chamber 28 therefore extends in the circumferential direction around the diffusor 18 and in the axial direction A extends a little beyond the axial end of the diffusor 18.

In the circumferential wall 26, the cap 14 in this case includes one single outflow opening 30 that is located in direct vicinity to the closed end 24. In this example, the outflow opening 30 is substantially circular and significantly larger than one single gas outlet opening 20 in the diffusor 18.

The deflector element 16 is inserted in the outflow opening 30 so that it projects from the cap 14 in the radial direction rG (in relation to the axial direction A).

In the configuration shown here, the deflector element 16 is a one-piece component part and is fabricated separately from the cap 14.

The deflector element 16 consists of a pot-shaped discharge portion 34 and an edge portion 36 that projects radially outwardly from a cap-side open end 38 of the discharge portion 34 (in this case the radial direction rD is related to a longitudinal direction of the discharge portion 34).

The discharge portion 34 has a peripheral sidewall 40 and a lid 41 which seals the sidewall 40 in a gastight manner at the longitudinal end of the deflector element 16 opposite to the open end 38.

In this example, the deflector element 16 includes two discharge openings 42a, 42b in the sidewall 40.

Gas that flows out of the diffusor 18 of the tubular gas generator 10 into the cap 14 flows through the outflow opening 30 into the deflector element 16 and, from there, through the two discharge openings 42a, 42b to the outside.

For example, an inflatable chamber of an airbag which can be filled via the tubular gas generator 10 (not shown) is connected to each of the discharge openings 42a, 42b. The gas can be directed from the discharge openings 42a, 42b also to any other applications.

In the examples shown here, exactly two discharge openings 42a, 42b are provided in the deflector element 16, but the number could also be chosen differently.

The two discharge openings 42a, 42b are opposed to each other in this case and are oriented so that each of their surface areas points to the axial direction A of the tubular gas generator 10. This arrangement is suited, for example, to fill a side airbag which is initially deployed in two directions thanks to the opposite outflow openings 42a, 42b.

It is conceivable to choose the cross-sectional areas of the two discharge openings 42a, 42b to be of equal size. As a result, the gas flowing out of the tubular gas generator 10 is divided into two gas flows which comprise equal amounts of gas.

Figure 6:
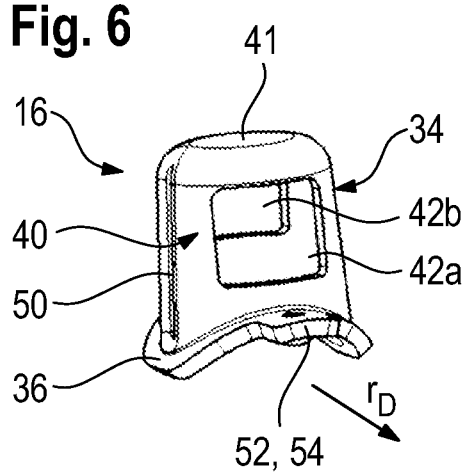
FIGS. 6 and 7 show schematic perspective views of different deflector elements of an assembly group according to the invention.
Figure 7:
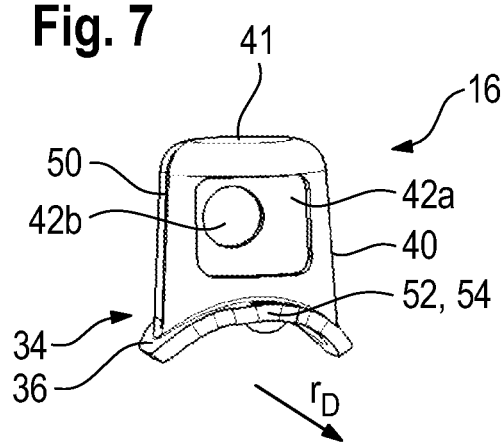

FIGS. 6 and 7, however, show variants in which the discharge opening 42a has a larger cross-sectional area than the discharge opening 42b, thus causing the two gas flows exiting through the respective discharge opening 42a, 42b to provide different amounts of gas. The gas flows can be divided at a ratio of 60/40 or 70/30, for example. Of course, the exact division is left to the skilled person's choice.

The shape of the cross-sectional area of the discharge opening 42a, 42b can also be selected at will. In this example, in FIG. 6 a rectangular cross-sectional shape is selected for each of the two discharge openings 42a, 42b, whereas in FIG. 7 the smaller discharge opening 42b has a circular shape.

The deflector elements 16 of FIGS. 6 and 7 merely differ by the shape of the discharge openings 42a, 42b and otherwise are identical as to their dimensions and their geometry.

Thus, for the respective application, from a choice of different deflector elements having suitable discharge openings 42a, 42b a deflector element 16 can be selected which is then mounted to the cap 14, while only one single variant of the cap 14 has to be provided which is adapted to the tubular gas generator 10.

The two discharge openings 42a, 42b are the only openings in this case through which gas flows out of the tubular gas generator 10 into the environment.

For mounting, initially the deflector element 16 is pushed from an interior 44 of the cap 14, with the lid 41 first, through the outflow opening 30, until the edge portion 36 abuts on the inner face of the circumferential wall 26 peripherally around the edge of the outflow opening 30. This is evident from FIG. 2, for example. The edge portion 36 follows the curvature of the circumferential wall 26, as is visible in FIGS. 6 and 7. This connection seals the transition from the cap 14 to the deflector element 16 and prevents a noteworthy escape of gas.

The discharge portion 34 now protrudes in the radial direction rG from the circumferential wall 26 of the cap 14 so that gas exiting through the discharge opening 42a, 42b flows into the environment of the tubular gas generator 10 for the intended application.

In the example shown here, a positioning structure 46 is provided which predetermines an exact orientation of the deflector element 16 relative to the cap 14 and which also prevents the deflector element 16 from rotating relative to the cap 14. The positioning structure 46 is formed in this case by a projection 48 at the edge of the outflow opening 30 which protrudes into the outflow opening 30, as well as by a corresponding groove 50 in the sidewall 40 of the deflector element 16. This ensures that the deflector element 16 can only be pushed through the outflow opening 30 when the projection 48 engages in the groove 50.

It is conceivable to select the dimensions of the deflector element 16 and the outflow opening 30 such that the deflector element 16 is held in the outflow opening 30 by a certain clamping effect. However, the deflector element 16 is not provided to be significantly deformed while it is mounted to the cap 14.

Figure 8:
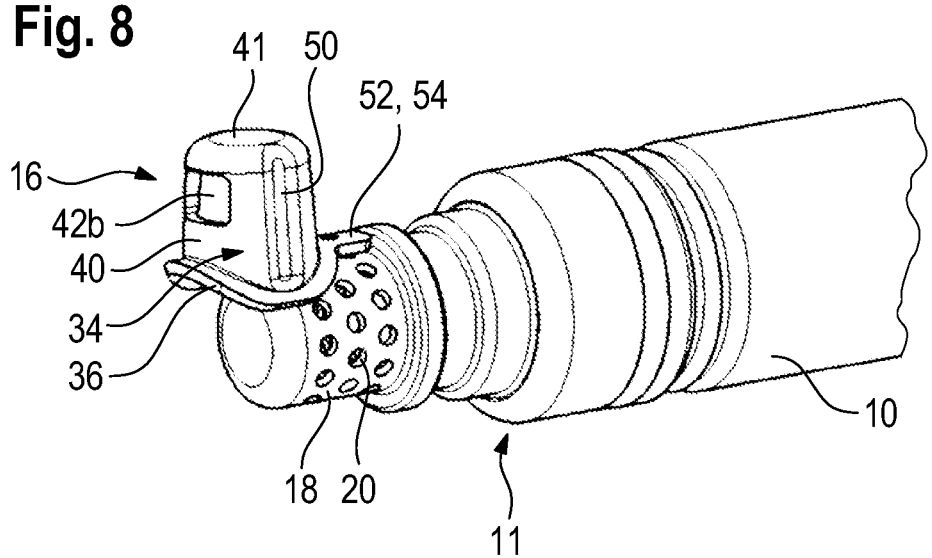
FIG. 8 shows a schematic perspective view of the arrangement of a deflector element in relation to the tubular gas generator in the tubular gas generator from FIG. 1.

In order to prevent undesired movements of the deflector element 16 which might result in noise development, for example, and, optionally, to fix a position of the deflector element 16 with respect to the cap 14 and the diffusor 18 of the tubular gas generator 10, in this example a rattle protection 52 is configured in the form of a projection 54 on the edge portion 36 which projects from the remaining edge portion 36 in the radial direction rD (see FIGS. 2, 6 and 8).

After mounting the deflector element 16 from inside to the cap 14, the cap 14 is attached onto the axial end 11 of the tubular gas generator 10 along the axial direction A and is slipped over the diffusor 18 so that the diffusor 18 comes to be located in the interior 44 of the cap 14.

The outflow opening 30 and the deflector element 16 in this case are located in the radial direction rG directly above the collection chamber 28. In this example, the outflow opening 30 in the axial direction A extends partially beyond the axial end of the diffusor 18.

The rattle protection 52 is now adjacent to the outer circumference of the tubular gas generator 10 and may be biased against the tubular gas generator 10 so that the deflector element 16 is retained at a fixed position between the tubular gas generator 10 and the cap 14.

Finally, the cap 14 is rigidly fastened at its open end 22 to the circumferential wall of the tubular gas generator 10, for example by crimping, flaring or, where appropriate, roller-burnishing or welding.

The assembly group 12 consisting of the cap 14 and the deflector element 16 now forms a unit with the tubular gas generator 10 and can be installed together with the latter.

The invention claimed is:

1. An assembly group comprising a cap configured to cover a diffusor of a tubular gas generator and a deflector element, wherein the cap is configured to create a space between an inner face of a wall of the cap and the diffusor, wherein the cap comprises an outflow opening for gas generated by the tubular gas generator and the deflector element comprises a discharge portion having at least one discharge opening through which the gas leaves the cap, wherein the deflector element is inserted into the outflow opening such that the discharge portion protrudes laterally outwardly through the outflow opening, projects from the cap, and an edge portion of the deflector element abuts at an edge of the outflow opening on the inner face of the wall of the cap, wherein a rattle protection is provided at the deflector element, the rattle protection being formed by a radial projection on the edge portion which is provided for abutting on an outer circumference of the tubular gas generator and/or is biased to press against the tubular gas generator.

2. The assembly group according to claim 1, wherein the discharge portion is pot-shaped and the edge portion is disposed at a cap-side edge of the discharge portion, while the at least one discharge opening is provided in a sidewall of the discharge portion.

3. The assembly group according to claim 1, wherein the deflector element is a one-piece component part separate from the cap.

4. The assembly group according to claim 1, wherein the deflector element is pushed from the inner face of the cap through the outflow opening.

5. The assembly group according to claim 1, wherein a positioning structure which permits mounting of the deflector element on the cap only in a predetermined orientation is provided at the cap and at the deflector element.

6. The assembly group according to claim 1, wherein the deflector element comprises two oppositely directed discharge openings.

7. The assembly group according to claim 6, wherein the two discharge openings have different cross-sectional areas.

8. The assembly group according to claim 1, wherein the at least one discharge opening points along an axial direction of the tubular gas generator.

9. A tubular gas generator comprising a thrust-neutral diffusor provided at an axial end and having a plurality of gas outlet openings on a circumferential wall of the diffusor, and comprising an assembly group according to claim 1, wherein the cap is slipped over the diffusor and a collection chamber through which the gas flows to the deflector element is formed between the diffusor and the cap.

10. A method for manufacturing a tubular gas generator according to claim 9, comprising the following steps:
the discharge portion of the deflector element is pushed from an interior of the cap through the outflow opening until the edge portion abuts on the inner face of the edge of the outflow opening, and subsequently the cap is firmly fixed to the tubular gas generator.

11. An assembly group comprising a cap configured to cover a diffusor of a tubular gas generator and a deflector element, wherein the cap is configured to create a space between an inner face of a wall of the cap and the diffusor, wherein the cap comprises an outflow opening for gas generated by the tubular gas generator and the deflector element comprises a discharge portion having at least one discharge opening through which the gas leaves the cap, wherein the deflector element is inserted into the outflow opening such that the discharge portion protrudes laterally outwardly through the outflow opening, projects from the cap, and an edge portion of the deflector element abuts at an edge of the outflow opening on the inner face of the wall of the cap, wherein the deflector element comprises two oppositely directed discharge openings having different cross-sectional areas.

\* \* \* \* \*